United States Patent
Iyengar et al.

(10) Patent No.: US 12,107,609 B2
(45) Date of Patent: Oct. 1, 2024

(54) METHODS AND APPARATUS FOR CONCURRENT SATELLITE POSITIONING SYSTEM AND COMMUNICATIONS OPERATION

(71) Applicant: QUALCOMM Incorporated, San Diego, CA (US)

(72) Inventors: Pranav Iyengar, San Diego, CA (US); Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/473,334

(22) Filed: Sep. 13, 2021

(65) Prior Publication Data

US 2022/0085839 A1 Mar. 17, 2022

Related U.S. Application Data

(60) Provisional application No. 63/079,320, filed on Sep. 16, 2020.

(51) Int. Cl.
*H04B 1/10* (2006.01)

(52) U.S. Cl.
CPC .......... *H04B 1/1027* (2013.01); *H04B 1/1018* (2013.01); *H04B 2001/1045* (2013.01); *H04B 2001/1063* (2013.01); *H04B 2001/1072* (2013.01)

(58) Field of Classification Search
CPC ............... H04B 1/1018; H04B 1/1027; H04B 2001/1045; H04B 2001/1063; H04B 2001/1072; G01S 19/36
See application file for complete search history.

(56) References Cited

U.S. PATENT DOCUMENTS

| | | | | |
|---|---|---|---|---|
| 2009/0115659 | A1* | 5/2009 | Watanabe | G01S 19/33 342/357.73 |
| 2013/0003783 | A1* | 1/2013 | Gudem | H04B 1/3805 375/140 |
| 2013/0107870 | A1* | 5/2013 | Neumann | H04B 1/525 370/347 |
| 2013/0208838 | A1 | 8/2013 | Wu et al. | |
| 2014/0106697 | A1 | 4/2014 | Wang et al. | |

(Continued)

OTHER PUBLICATIONS

International Search Report and Written Opinion—PCT/US2021/050293—ISA/EPO—Dec. 23, 2021.

*Primary Examiner* — David S Huang
(74) *Attorney, Agent, or Firm* — QUALCOMM Incorporated

(57) ABSTRACT

A mobile device may be configured to perform concurrent Satellite Positioning System and communication system operation, e.g. enabling an SPS receiver to continue to receive SPS signals in frequency bands that are interfered with due to aggressor transmission signals. A controllable filter, such as a selectable and/or tunable notch or lowpass filter is used to reject the aggressor transmission signals. The controllable filter may also attenuate some, but not all, frequencies in the SPS L1 band. To avoid losing complete access to these filtered SPS signal frequencies, the controllable filter is controlled, e.g., selected or tuned to these frequencies only when the aggressor transmission signal is active, and is otherwise turned off or tuned away from the SPS signal frequencies.

39 Claims, 5 Drawing Sheets

(56) References Cited

U.S. PATENT DOCUMENTS

| | | | |
|---|---|---|---|
| 2015/0035701 A1* | 2/2015 | Zhang | H04B 1/71 342/357.59 |
| 2019/0326886 A1 | 10/2019 | Lennen | |
| 2021/0055425 A1* | 2/2021 | Guo | G01S 19/07 |

* cited by examiner

"METHODS AND APPARATUS FOR
CONCURRENT SATELLITE POSITIONING
SYSTEM AND COMMUNICATIONS
OPERATION"

CLAIM OF PRIORITY UNDER 35 U.S.C. § 119

This application claims under 35 USC § 119 the benefit of and priority to U.S. Provisional Application No. 63/079,320, filed Sep. 16, 2020, entitled "METHODS AND APPARATUS FOR CONCURRENT SATELLITE POSITIONING SYSTEM AND COMMUNICATIONS OPERATION," which is assigned to the assignee hereof and is incorporated herein by reference in its entirety.

BACKGROUND OF THE DISCLOSURE

1. Field of the Disclosure

Aspects of the disclosure relate generally to wireless communications and positioning.

2. Description of the Related Art

A receiver for Satellite Positioning Systems (SPS) and a transceiver for wireless communication systems are often embedded in a mobile device, such as a mobile phone, a wearable device, a laptop computer, an Internet of Thing (IoT) device, etc. SPS, for example, may include Global Navigation Satellite Systems (GNSS), such as Global Positioning System (GPS), while wireless communication systems include, e.g., terrestrial Wireless Wide Area Networks (WWAN), such as Long-Term Evolution (LTE) or Fifth Generation New Radio (5G NR), non-terrestrial WWANs, e.g., satellite communication systems, and Wireless Local Area Networks (WLAN), such as Wi-Fi. The SPS receiver may receive SPS signals from satellite vehicles and provide the SPS signals to a positioning operation, whereas the wireless communication transceiver may receive and transmit wireless data and control signals for various communication operations. The wireless communication signals or their harmonics, particularly for satellite communication systems may be in or very near the same frequency band as the SPS signals. Moreover, the wireless communication signals may have significantly greater power than the SPS signals. Consequently, if a mobile device receives SPS signals while high power wireless communication signals are transmitted, the wireless communication signals or their harmonics may interfere with the SPS signals, which can adversely affect the reception of the SPS signals as well as the positioning operation of the mobile device. As such, there is need for improvement in the field of wireless communication devices to manage concurrent SPS and wireless communications operations.

SUMMARY

A mobile device may be configured to perform concurrent Satellite Positioning System and communication system operation, e.g. enabling an SPS receiver to continue to receive SPS signals in frequency bands that are interfered with due to aggressor transmission signals by the mobile device. A controllable filter, such as a selectable and/or tunable notch or lowpass filter is used to reject the aggressor transmission signals. The controllable filter may also attenuate some, but not all, frequencies in the SPS L1 band. To avoid losing complete access to these filtered SPS signal frequencies, the controllable filter is controlled, e.g., selected or tuned to these frequencies only when the aggressor transmission signal is active, and is otherwise turned off or tuned away from the SPS signal frequencies.

In one implementation, a method performed by a mobile device for supporting satellite positioning system (SPS) operation, includes determining when an aggressor transmission signal is active, the aggressor transmission signal having an aggressor carrier frequency that interferes with SPS signals received in at least one frequency band in a plurality of frequency bands received by an SPS receiver; generating a control signal when the aggressor transmission signal is active; controlling a controllable filter based on the control signal to attenuate the aggressor carrier frequency, wherein at least part of the at least one frequency band is attenuated with the aggressor carrier frequency while a remaining plurality of frequencies are passed by the controllable filter; and acquiring and tracking the SPS signals in the remaining plurality of frequency bands while the controllable filter attenuates the at least part of the at least one frequency band with the aggressor carrier frequency.

In one implementation, a mobile device configured to support satellite positioning system (SPS) operation, includes a satellite positioning system (SPS) receiver configured to receive SPS signals over a plurality of frequency bands; a controllable filter configured to receive a control signal and to attenuate one or more frequencies of SPS signals received by the SPS receiver; a controller coupled to the SPS receiver and the controllable filter and configured to: determine when an aggressor transmission signal is active, the aggressor transmission signal having an aggressor carrier frequency that interferes with the SPS signals received in at least one frequency band in the plurality of frequency bands received by the SPS receiver; generate the control signal when the aggressor transmission signal is active, wherein the controllable filter is controlled based on the control signal to attenuate the aggressor carrier frequency, wherein at least part of the at least one frequency band is attenuated with the aggressor carrier frequency while a remaining plurality of frequencies are passed by the controllable filter; and wherein the SPS signals in the remaining plurality of frequency bands is acquired and tracked by the SPS receiver while the controllable filter attenuates the at least part of the at least one frequency band with the aggressor carrier frequency.

In one implementation, a mobile device configured to support satellite positioning system (SPS) operation, includes means for determining when an aggressor transmission signal is active, the aggressor transmission signal having an aggressor carrier frequency that interferes with SPS signals received in at least one frequency band in a plurality of frequency bands received by an SPS receiver; means for generating a control signal when the aggressor transmission signal is active; means for controlling a controllable filter based on the control signal to attenuate the aggressor carrier frequency, wherein at least part of the at least one frequency band is attenuated with the aggressor carrier frequency while a remaining plurality of frequencies are passed by the controllable filter; and means for acquiring and tracking the SPS signals in the remaining plurality of frequency bands while the controllable filter attenuates the at least part of the at least one frequency band with the aggressor carrier frequency.

In one implementation, a non-transitory storage medium including program code stored thereon, the program code is operable to configure at least one controller in a mobile device to support satellite positioning system (SPS) operation, the program code comprising instructions to: determine when an aggressor transmission signal is active, the aggressor transmission signal having an aggressor carrier frequency that interferes with SPS signals received in at least one frequency band in a plurality of frequency bands received by an SPS receiver; generate a control signal when the aggressor transmission signal is active; control a controllable filter based on the control signal to attenuate the aggressor carrier frequency, wherein at least part of the at least one frequency band is attenuated with the aggressor carrier frequency while a remaining plurality of frequencies are passed by the controllable filter; and acquire and track the SPS signals in the remaining plurality of frequency bands while the controllable filter attenuates the at least part of the at least one frequency band with the aggressor carrier frequency.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
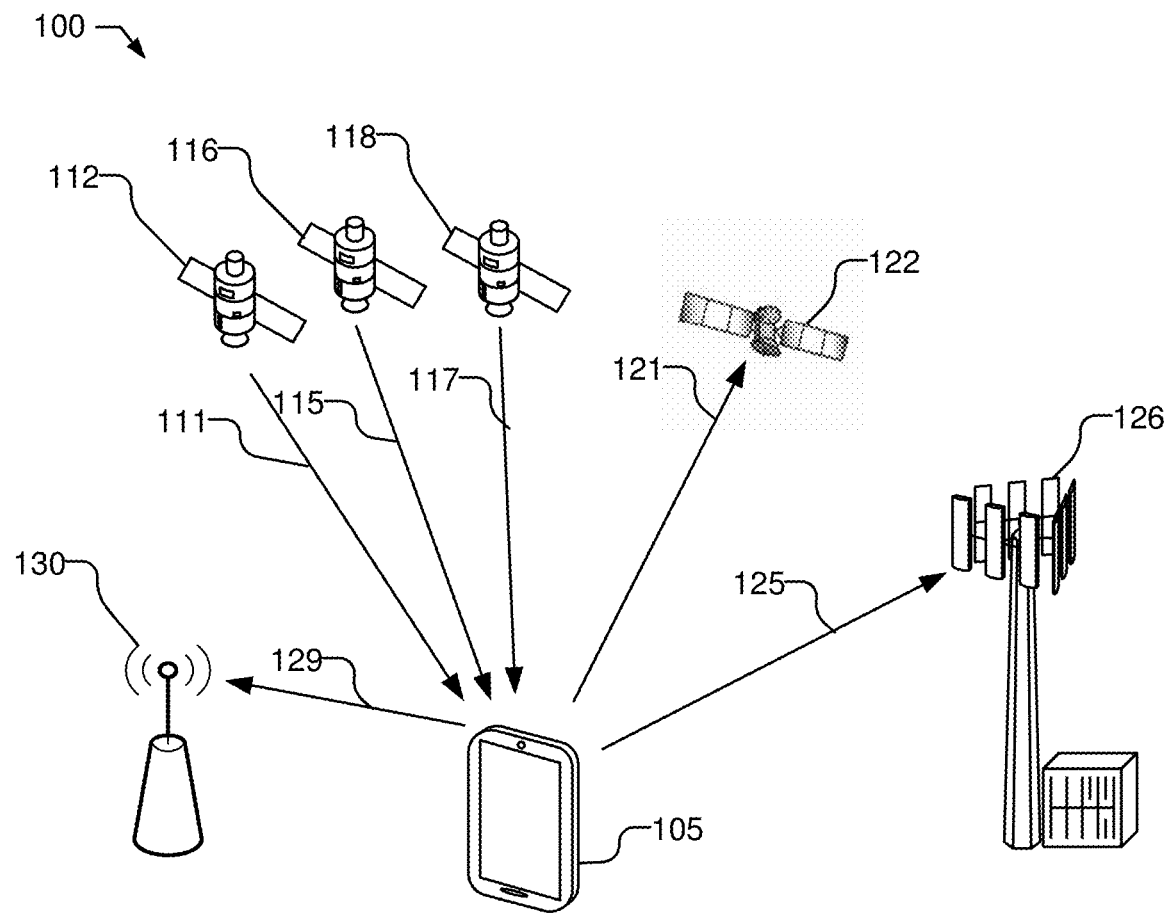
FIG. 1 illustrates a simplified diagram of an system in which reception of SPS signals by the mobile device may be affected by the transmission of wireless communication signals.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Satellite Positioning System (SPS) receivers and wireless transmitters, such as Wireless Wide Area Network (WWAN) and Wireless Local Area Network (WLAN) transmitters, are often embedded in a mobile device, such as a mobile phone, a wearable device, a laptop computer, an Internet of Thing (IoT) device, or a semiautonomous or autonomous vehicle, such as a ground vehicle, i.e., a self-driving car or truck, or an aerial vehicle, such as a unmanned aerial vehicle (UAV) sometimes referred to as a drone, etc. The SPS receiver may receive SPS signals from satellite vehicles and performs positioning operations based on the received SPS signals. The SPS receiver may support different global or regional positioning systems, such as Global Positioning System (GPS) signals, GLOobal NAvigation Satellite System (GLONASS) signals, Galileo (GAL) signals, BeiDou (BDS) signals, and/or signals of other type of satellite positioning system.

The wireless transmitter transmits and receives wireless signals for various communication operations, including data and control. A WWAN transmitter may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, e.g., satellite-based, communication systems. In some implementations, satellite-based communication systems may be combined with terrestrial wireless communications systems, such as 5G New Radio (NR) networks. In such a system, a mobile device may access a satellite, also referred to as a satellite vehicle (SV), instead of a terrestrial base station, which may connect to an earth station, also referred to as a ground station or non-terrestrial (NTN) gateway, which in turn may connect to a 5G network. A WLAN transmitter may support various communications systems including Wi-Fi, Long-Term Evolution (LTE) Direct, etc.

Multiple satellite bands are allocated to satellite usage. These include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BeiDou, and is broken into five bands, the L1 Band: 1575.42 MHz, L2: 1227.60 MHz, L3 Band: 1381.05 MHz, L5 Band: 1176.45 MHz. For location purposes, the L1 band has been historically been used by commercial GNSS receivers. However, measuring GNSS signals across more than one band may provide for improved accuracy and availability.

The WWAN signals, particularly satellite based communication signals, or their harmonics, can be in or near the same frequency band as the SPS signals. Moreover, the satellite communication signals transmitted by the mobile device may be transmitted at significantly greater power than SPS signals, and thus may interfere with reception of the SPS signals, which can adversely affect the SPS related operation of the mobile device, such as determination of position, velocity, time, or a combination thereof. Accordingly, these satellite communication signals are sometimes referred to herein as aggressor satellite communication signals.

For example, two recently approved communications systems (Ligado and GlobalStar) use frequencies that are very near the Institute of Electrical and Electronics Engineers (IEEE) L1 band used for SPS, and in particular, the Glonass G1 satellite transmissions. Ideally, an SPS receiver should capture and process as many SPS signals, including various types of positioning systems, such as GPS, GLONASS, GAL, BDS, etc., to provide as many constellations and satellites as possible. In typical low cost SPS receivers, the full L1 band (e.g., from the low end frequencies for the Beidou B1i satellite transmissions to the upper end frequencies with the Glonass G1 satellite transmissions) is captured with a single down convert chain, rather than using two or three separate down convert chains, which will increase cost.

Using a wide frequency range in the SPS receiver to cover the full L1 band, it is difficult to effectively reject the satellite communication signals that are very near the L1 band, without using high cost, higher selectivity components having a sharp and accurate frequency roll off. Consequently, when the mobile device is transmitting aggressor satellite communication signals, an L1 SPS receiver with a single down convert section must blank or disable its input to avoid saturating or even damaging the sensitive SPS L1 front end, thereby disabling all L1 SPS signals including GPS, GAL, BDS, and GLO.

While, a multi-band SPS receiver that disables the L1 band during transmission of aggressor satellite communication signals will still have the L5 signals available to continue positioning, the L5 signals are wideband and require more resources to acquire and track than L1 signals. For example, the L5 signals have 10 times the number of code hypotheses as L1 signals, and processing the same 1 msec code length period for L5 signals requires 10 times the number of correlation computations than needed for L1 signals. This effectively means the wideband L5 signals requires up to 100 times the resources to acquire and track as their L1 counterparts. Further, some of the SPS signals, such as GPS L2C, in the L5 band is often not processed by the hardware or software in conventional SPS receives, and is therefore unavailable. Accordingly, the loss of SPS signals in the L1 band during aggressor satellite communication signal transmission periods significantly degrades the overall performance of SPS receives.

Disclosed herein are techniques for supporting concurrent SPS and satellite communication system operation, e.g., enabling the SPS receiver to continue to receive SPS signals in frequency bands that are interfered with due to aggressor transmission signals, without requiring complicated, and expensive, filters that can reject only the aggressor transmission signals. For example, a controllable filter, e.g., a selectable and/or tunable notch filter, low pass filter, high pass filter, bandpass filter, comb filter, or any combination thereof, may be used to attenuate an aggressor carrier frequency. In order to reject the aggressor transmission signals, the controllable filter may also attenuate some, but not all, frequencies in the SPS signal frequency band. To avoid losing complete access to these filtered SPS signal frequencies, the controllable filter is controlled, e.g., turned on or the bandstop frequency tuned to these frequencies when the aggressor transmission signal is active, and may otherwise be turned off or tuned away from the SPS signal frequencies when the aggressor transmission signal is not active. Accordingly, SPS signals in the frequency band that is interfered with may be received even when the aggressor transmission signal is active by rejecting only a portion of that frequency band, and SPS signal in the full frequency band may be received when the aggressor transmission signal is not active.

FIG. 1 illustrates a simplified diagram of a system 100 in which reception of SPS signals by the mobile device 105 may be affected by transmission of aggressor communication signals by the mobile device 105 to a wireless communication device, such as communication satellite 122. The SPS signals can be transmitted based on various satellite position signaling standards, such as a GPS, GLONASS, GAL, BDS, and/or other type of satellite positioning system. A mobile device 105 can include a satellite positioning system (SPS) receiver that may be compatible with one or more of these satellite position signaling standards. The SPS receiver may process the SPS signals on one or more frequency bands based on the signaling standards to extract information, and perform a position calculation operation based on the extracted information.

Mobile device 105 may be a device designed to perform numerous functions, including the ability to determine its own position based on the reception of SPS signals from satellites. Mobile device 105 is able to perform satellite-based positioning by receiving SPS signals from one or more satellites. As shown here, mobile device 105 receives SPS signals 111, 115, and 117 from positioning satellites 112, 116, and 118, respectively. The SPS signals may be, e.g., any Global Navigation Satellite System (GNSS) such as GPS, GLONASS, GAL, or Beidou or some other local or regional system such as Indian Regional Navigation Satellite System (IRNSS), Quasi-Zenith Satellite System (QZSS), European Geostationary Navigation Overlay Service (EGNOS) or Wide Area Augmentation System (WAAS).

Typically, each of the SPS signals 111, 115, and 117 would include timing information relating to when the SPS signal was transmitted from the respective satellite. Each SPS signal may also include ephemeris information which can be used to determine the position of the satellite at the time the SPS signal is transmitted. Mobile device 105 is able to determine when it receives each of the SPS signals 111, 115, and 117. The transmission time and reception time of each SPS signal may be aligned on a common timing reference, such as a common clock, known to the mobile device 105. By taking the difference between the reception time and transmission time, mobile device 105 may compute the flight time associated with each SPS signal, for it to travel from the respective satellite to mobile device 105. The flight time can then be used to compute the distance between each satellite and mobile device, taking into account the speed of light. Once the distance between each satellite and the mobile device is found, trilateration may be used to compute the position of mobile device 105, based on the known position of each satellite and the distance between each satellite and mobile device 105. SPS signals may be further used for determining the velocity of the mobile device 105, and may be further used for determination of absolute time.

In addition to satellite-based positioning, another category of functions that may be performed by mobile device 105 relates to wireless communications. Wireless communications may serve as an important link in connecting mobile device 105 over private and/or public networks with other devices such as servers and other mobile devices. This may include communication over various types of wireless networks, including wireless local area networks (WLAN) and wireless wide area networks (WWAN), among others. Examples of WLANs may be different types of Wi-Fi networks, such as those implemented based on various 802.11 standards. FIG. 1 illustrates wireless communications between the mobile device 105 and a terrestrial base station 126, a communication satellite 122, and an access point 130. However, other examples of wireless communications may include peer-to-peer communications between mobile devices such as Wi-Fi Direct, Long-Term Evolution (LTE) Direct, or Proximity-based Services (ProSe) Direction Communication (PC5), etc. Examples of WWAN may include satellite communications, 5G NR, LTE, wideband code division multiple access (WCDMA), and the like.

Additional examples of wireless communications may include near field communications (NFC), Bluetooth communications, etc.

As used herein, the terms "mobile device" and "base station" are not intended to be specific or otherwise limited to any particular Radio Access Technology (RAT), unless otherwise noted. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), semi-autonomous or autonomous ground vehicle (e.g., automobile, truck, motorcycle, bicycle, etc.), semi-autonomous or autonomous aerial vehicle (e.g., UAV or drone), Internet of Things (IoT) device, etc.) used by a user to communicate over a wireless communications network. A mobile device may be mobile or may (e.g., at certain times) be stationary, and may communicate with a Radio Access Network (RAN). As used herein, the term "mobile device" may be referred to interchangeably as an "user equipment," "access terminal" or "AT," a "client device," a "wireless device," a "subscriber device," a "subscriber terminal," a "subscriber station," a "user terminal" or UT, a "mobile terminal," a "mobile station," or variations thereof. Generally, mobile devices can communicate with a core network via a RAN or in some cases a communication satellite, and through the core network the mobile devices can be connected with external networks such as the Internet and with other mobile devices. Of course, other mechanisms of connecting to the core network and/or the Internet are also possible for the mobile devices, such as over wired access networks, wireless local area network (WLAN) networks (e.g., based on IEEE 802.11, etc.) and so on.

As illustrated in FIG. 1, the mobile device 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. For instance, mobile device 105 may transmit communication signals 125 on a wireless communication link to a base station 126 and a communication signal 129 to an access point 130 on a wireless communication link. The base station 126, for example, may be part of a Radio Access Technology (RAT) and may support LTE or 5G NR communications, and access point 130 may support IEEE 802.11 WiFi. FIG. 1 highlights the wireless signals transmitted from mobile device 105 (as opposed to wireless signals received by mobile device 105), because various embodiments of the present invention addresses techniques to reduce interference caused by such transmitted signals, but it should be understood that communication signals may be both transmitted and received by the mobile device 105 via the wireless communication links.

The mobile device 105 may further or alternatively support wireless communications with a communication satellite 122. For example, the mobile device 105 may perform wireless communications by sending signals to, and receiving signals from one or more communication satellites 122 via a wireless communication link. FIG. 1, by way of example, illustrates mobile device 105 transmitting a communication signal 121 on a wireless communication link to a communication satellite 122. It should be understood that the communication satellite 122 is separate from positioning satellites 112, 116, and 118 and is not part of the SPS. The communication satellite 122 may be part of a wireless communication network, such a 5G New Radio (NR) or some other wireless access type such as Code Division Multiple Access (CDMA). FIG. 1 highlights the wireless signal transmitted from mobile device 105 to the communication satellite 122 (as opposed to wireless signals from the communication satellite 122 that are received by mobile device 105), because various embodiments of the present invention addresses techniques to reduce interference caused by such transmitted signals, but it should be understood that communication signals may be both transmitted and received by the mobile device 105 via a wireless communication link.

The carrier frequency (or harmonics) for the transmitted communication signal 121 from the mobile device 105 may be in or near the SPS frequency bands used by SPS satellites 112, 116, and 118, and may interfere with the reception of SPS signals. For example, the transmitted communication signal 121 from the mobile device 105 may interfere with SPS signals received in at least one frequency band received by the mobile device 105, and therefore the transmitted communication signal 121 may be referred to as an aggressor transmission signal having an aggressor carrier frequency. Interference with frequencies within the SPS frequency bands may occur due to harmonics or intermodulation products of the aggressor carrier frequency of the transmitted wireless signal 121.

Figure 2:
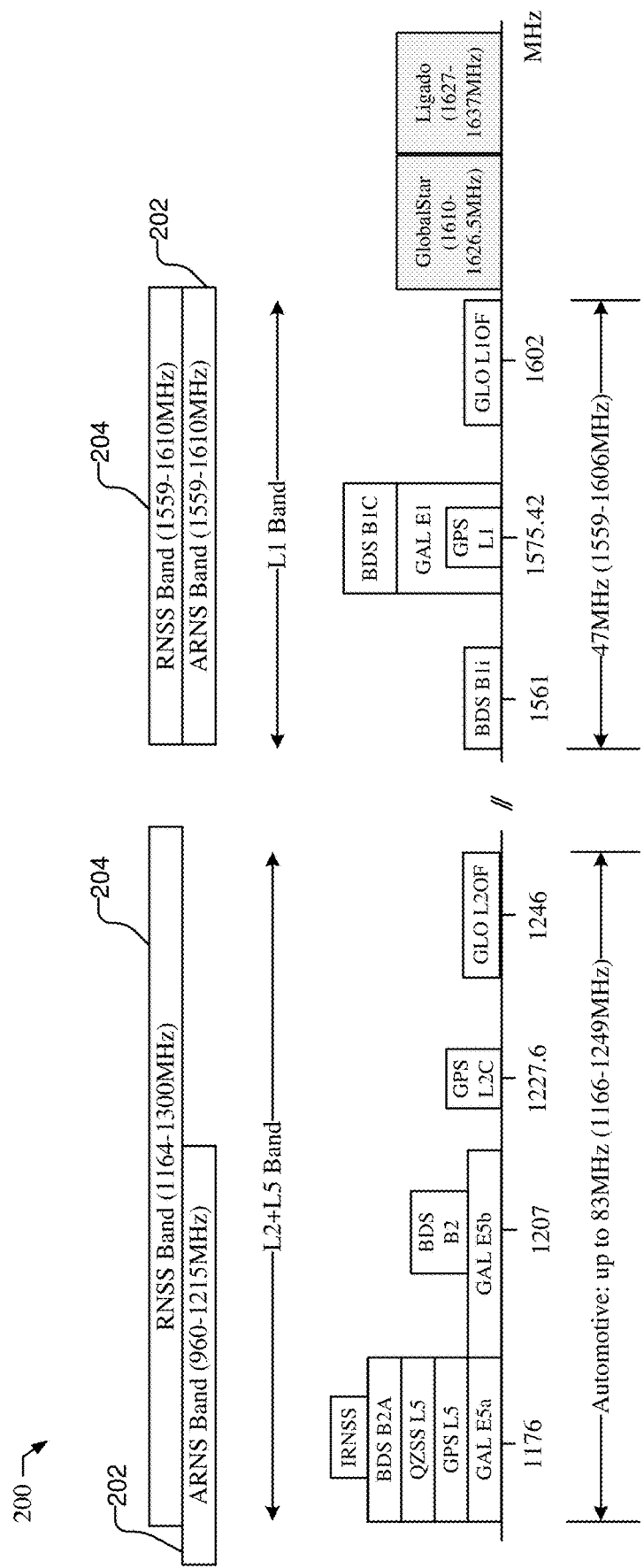
FIG. 2 illustrates an example spectrum diagram of SPS signals and wireless communication signals.

FIG. 2 illustrates examples of SPS signals 200 and their frequency bands as well as aggressor carrier frequencies that may interfere with reception of SPS signals. SPS operates on several frequencies in the L-Band as illustrated in FIG. 2. The L1 band covers 1159 MHz to 1606 Mhz and includes the L1 signals from GPS, Galileo, Beidou, and Glonass, as well as QZSS (not shown). These same constellations also transit simultaneously in other frequencies in the L2 and/or L5 band as shown in FIG. 2. In addition, there is an India regional system (NaVIC) which transmits in the L5 band. As shown by bands 202 of frequencies, there exists a protected region called the Aeronautical Radio Navigation System (ARNS) band whereby other signals are not permitted to be used, for communications or other purposes, to protect the Radio Navigation Signals from interference. Frequency bands 204 correspond to the Radio Navigation Satellite Service, where the SPS signals belong.

As shown in FIG. 2, a first set of SPS signals can occupy a frequency band of 1166-1249 MHz, which corresponds to the IEEE L2 band and L5 band. The first set of SPS signals may include, for example, IRNSS signal, BeiDou B2a signal (labelled "BDS B2a" and "BDS B2"), QZSS signal (labeled "QZSS L5"), Galileo E5a and E5b signals (labelled "GAL E5a" and "GAL E5b"), GPS L2 and L5 signals (labelled "GPS L2C" and "GPS L5"), and GLONASS signals (labelled "GLO L2OF", though sometimes also referred to as G2). Each of the first set of SPS signals includes a carrier of a pre-determined frequency. For example, IRNSS, BDS B2a, QZSS L5, GPS L5, and GAL E5a each has a carrier frequency of 1176 MHz, GAL E5b and BDS B2 has a carrier frequency of 1207 MHz, GPS L2C has a carrier frequency of 1227.6 MHz, whereas GLO L2OF or G2 has a carrier frequency of 1246 MHz.

Aa second set of SPS signals occupies a frequency band of 1559-1606 MHz, which corresponds to the IEEE L1 band. The second set of SPS signals may include, for example, BeiDou B1 signal (labelled "BDS B1i"), BeiDou B1C signal (labelled "BDS B1C"), Galileo E1 signal (labelled "GAL E1"), GPS L1 signal (labelled "GPS L1"), and GLONASS L1OF signal (labelled "GLO L1OF", though sometimes also referred to as G1). Each of the second set of SPS signals also includes a carrier of a pre-determined frequency. For example, BDS B1i has a carrier frequency of 1561 MHz, BDS B1C, GAL E1, and GPS L1 each has a carrier frequency of 1575.42 MHz, GLO L1OF or G1 has a central carrier frequency of 1602 MHz.

Usage outside of the ARNS bands 202 is permitted. Wireless communications, such as WWAN, WiFi, Bluetooth, for example, must reside outside of the ARNS band. Most communications frequencies are typically far enough away from the SPS signal bands L1 and L2+L5 to allow suppression of the communication signal with front end SAW (Surface Acoustic Wave) filters, to reduce and prevent interference and front end saturation into the SPS bands.

Two recently approved communications systems (Ligado and GlobalStar), however, use frequencies that are outside of the ARNS bands 202, but are very close to the L1 band, as shown in FIG. 2. For example, Ligado frequencies are partly from 1627-1637 MHz and GlobalStar frequencies are from 1610 to 1626.5 MHz.

It is desirable for the SPS receiver in mobile device 105 to capture and process as many SPS signals as possible to increase the number of constellations and satellites used. Thus, to capture the upper end of the Glonass G1 satellite transmission in the L1 band, the SPS receiver must receive signals up 1606 MHz. At the same time, to capture the Beidou B1i signal satellite transmission in the L1 band, the SPS must also receive signals down to 1559 MHz. In some SPS receivers, the full range of the 1559 MHz to 1606 MHz frequencies in the L1 band is captured using a single down convert chain for lower cost.

With a wide frequency range to cover in the L1 band, it is difficult for a conventional SPS receiver to effectively reject the Ligado and GlobalStar frequencies without using high cost, higher selectivity components having sharp and accurate frequency roll offs. Consequently, when a mobile device 105 is transmitting in the Ligado or GlobalStar frequencies, the L1 SPS receiver, e.g., using a single down convert section, must blank or disable its input to avoid saturating or even damaging the sensitive SPS L1 front end. Accordingly, during Ligado or GlobalStar transmission by the mobile device 105, the L1 SPS receiver may essentially disable all L1 SPS signals, including the GPS, GAL, BDS, and GLO.

A multi-band SPS receiver will still be able to receive the L5 signals and the L2 signals such as GPS L2C and GLO G2 to continue providing an estimated position fix, velocity, and/or time, even when the L1 band is disabled. The L5 signals, however, are wideband and require more resources to acquire and track than the L1 band. For example, L5 signals have 10 times the number of code hypotheses as L1 signals, and processing the same 1 msec code length period requires 10 times the number of correlation computations. Accordingly, wideband L5 signals effectively require up to 100 times the resources to acquire and track as their L1 counterparts. Additionally, L2 band signals, such as GPS L2C is often not processed by the hardware or software, and is therefore unavailable. Accordingly, with reception of L1 SPS signals disabled during Ligado or GlobalStar transmission periods, the SPS receiver overall performance is significantly degraded.

Moreover, the SPS signals available in the L5 band may be less suitable for acquisition procedures compared to SPS signals in the L1 band. For example, the SPS receiver in the mobile device 105 may receive frequency bands in both the L1 band and the L2 and/or L5 bands. However, SPS signals in the L2 band or the L5 band are less suitable for acquisition procedures than SPS signals in the L1 band. Accordingly, if the SPS signals are not acquired and tracked using the L1 band before the Ligado or GlobalStar transmission occurs, the time to first fix (TTFF) will significantly increase as the SPS receiver attempts to acquire and track on L5 signals without the L1 signals.

Some communication systems, such as with Ligado, use a large percentage of the duty cycle of mobile device transmissions. For example, the transmission by the mobile device 105 may at most be ON for 2.0 out of every 2.5 seconds. If L1 SPS signals were acquired and tracked while the transmissions are not active, this would allow only 20% window to acquire and track the L1 SPS signals, before using the L5 signals for tracking. Thus, the SPS receiver must wait for the 0.5 second window to acquire and track the L1 signals, and because it may require more than 0.5 second to acquire and track the L1 SPS signals, which is common especially for challenged SPS environments where the signal strength is low such as indoors, inside a car or parking structure, multiple duty cycles may be required to acquire and track the L1 signals, again significantly impacting the TTFF performance.

To support concurrent SPS and satellite communication system operations, a controllable filter may be used to attenuate an aggressor carrier frequency that interferes with one or more SPS frequencies. The controllable filter may be controlled to reject the aggressor signal transmissions, e.g., above 1610 MHz, while the aggressor signal transmissions are active. Instead of requiring the use of high cost, higher selectivity components having sharp and accurate frequency roll offs, the controllable filter may be a relatively simple and inexpensive bandstop, e.g., notch, low pass filter, high pass filter, bandpass filter, comb filter, or a combination thereof, which results in a attenuation of a portion of the SPS frequencies, e.g., the GLO L1OF or G1 signals. The remaining signals in the L1 band, however, will still be received by the SPS receiver. Moreover, the controllable filter may be selectable or tunable to attenuate the aggressor signal transmissions (along with a portion of the SPS frequencies) only when the aggressor signal transmissions are active. For example, the controllable filter may be turned on while the aggressor signal transmissions are active and turned off when the aggressor signal transmissions are not active. In another example, the controllable filter may be tunable to the aggressor frequency channel when the aggressor signal transmissions are active and tuned away from the aggressor frequency channel, or more accurately tuned away from the SPS frequencies, when the aggressor signal transmissions are not active.

Thus, with the use of the controllable filter with a low cost architecture with low cost components, the controllable filter may suppress actively interfering transmission signals. While filtering the aggressor signal transmissions, SPS frequencies, such as the Glonass G1 signals, may be unavailable, but other L1 SPS signals are available. Moreover, Glonass G1 signals may be available when the aggressor signal transmissions are not active and the controllable filter is turned off or tuned away from the SPS frequencies.

For example, controllable filter may be controlled (selectable) to be turned on or off based on the whether the aggressor transmission signal is active or not. A selectable filter may be a notch, lowpass filter, high pass filter, bandpass filter, comb filter or a combination thereof, that suppresses the aggressor transmission signals, e.g., the Ligado and/or GlobalStar transmissions signals, when the aggressor transmission signals are active. Due to the Ligado and GlobalStar frequencies being near to the L1 band, and specifically, near the Glonass G1 frequencies, the notch/lowpass cutoff frequency accuracy and roll-off sharpness constraints of the controllable filter may also suppress a portion of the L1 band, e.g., specifically, the Glonass G1 signals, which are the closest to the Ligado and GlobalStar frequencies.

Designing a filter than can properly pass 1559 MHz to 1606 MHz, but reject 1611 Mhz and above is technically challenging with a low cost filter. However, by foregoing a portion of the L1 SPS signals, e.g., the Glonass G1 signals, but requiring the other L1 SPS signals to still be available, relaxes the filter requirement to passing 1159 MHz to 1578 MHz, while rejecting 1611 MHz and above, which is practical to achieve in a low cost manner.

The controllable filter may be non-tunable, i.e., a static filter, that is tuned to the aggressor transmission signal carrier frequencies, e.g., the GlobalStar and Ligado frequencies, and is selectable, i.e., turned on, or turned off. For example, when the aggressor transmissions signals are active, e.g., when the Ligado or GlobalStar transmission signals are active, the selectable filter may be turned on and the, e.g., notch or lowpass filter, may suppress the coupled transmission power from the aggressor transmissions signal, thereby avoiding saturation and damage to the L1 SPS front end. While a portion of the L1 SPS signals may be suppressed, e.g., the Glonass G1 signals, with correct specification of the notch or pass frequency and roll-offs, the other L1 SPS signals (GPS, GAL, BDS) are still able to pass and available. When the aggressor transmission signals are not active, the selectable filter may be turned off, thereby permitting reception of the full SPS frequencies, including, e.g., the Glonass G1 signals.

In another implementation, the controllable filter may be tunable, e.g., the notch filter, lowpass filter, high pass filter, bandpass filter, comb filter, or a combination thereof, with cut off frequencies that may be tuned based on whether the aggressor transmission signal is active or not. When the aggressor transmission signal is active, the tunable filter may be controlled to tune the notch or cutoff frequency to suppress the coupled transmission power from the aggressor transmissions signal, thereby avoiding saturation and damage to the L1 SPS front end. While a portion of the L1 SPS signals may be suppressed, e.g., the Glonass G1 signals, with correct specification of the notch or pass frequency and roll-offs, the other L1 SPS signals (GPS, GAL, BDS) are still able to pass and available. When the aggressor transmission signal is not active, the tunable filter may be controlled to tune the notch or cutoff frequency away from the SPS signal frequencies, e.g., away from the L1 band, so that all of the SPS signal frequencies may be received, including the Glonass G1 signals.

In one implementation, the controllable filter may be a modified notch filter in the mobile device 105. For example, devices which support concurrent LTE+GNSS, such as Smartphones, may already have a fixed non-tunable notch filter that is used to suppress the 2nd harmonic of terrestrial B13 and B14 transmissions that fall in the Galileo E1 band. The fixed/static notch filter is typically located in the GNSS receiver path, before the eLNA (external low noise amplifier) and is tuned to the LTE B13/14 carrier frequency (e.g., 787 MHz). The fixed/static notch filter is used to attenuate the B13/14 fundamental signal sufficient enough to prevent the eLNA and other downstream circuitry (which have some amount of non-linearity) from generating a strong second harmonic. In one implementation, the fixed/static notch filter may be modified so that it is tunable, for example, such that it may be tuned from the fundamental of the terrestrial B13 and B14 transmissions, to the Ligado and/or GlobalStar frequencies. Circuit design for filters, such as notch filter, lowpass filter, high pass filter, bandpass filter, comb filter, and for a static filter and a tunable filter are well known by those of ordinary skill in the art. The fixed/static notch filter may be modified to be tunable to the desired frequencies, e.g., Ligado and/or GlobalStar frequencies, and B13 and B14 transmissions, e.g., with appropriate circuit design changes, based on well-known circuit designs for static and tunable notch filters. The benefit is that a single tunable notch filter will suffice, and thus, low cost is maintained and manufacturing is simplified, as only a single hardware design is needed along with appropriate band notching selection, e.g., in software. For a multi-mode device, e.g., capable of terrestrial or non-terrestrial wireless communications, it is also noted that at any given time, only one of the transmissions will be active. Depending on the carrier, either B13 or B14 transmissions may be used by the mobile device 105 for Terrestrial communication, and, for example, if the terrestrial network is down or unreliable, the mobile device 105 may use non-terrestrial communications, e.g., transmissions on the Ligado or GlobalStar frequencies. Thus, a single tunable lower selectivity filter is sufficient and maintains low cost.

It is noted that the temporary loss of Glonass G1 signals, due to filtering out the aggressor transmissions signals may be considered an acceptable trade off. Glonass G1 is the only GNSS constellation that is FDMA while the other GNSS constellations are CDMA. As a result, there are inter-frequency group delay biases between the satellites that must be calibrated or accounted for, including drifts over time. Given these additional biases, the performance from Glonass is typically lower than can be obtained from the other constellations, which are all CDMA and do not suffer from such inter-frequency group delay biases when only L1 or L5 signals are used. As such, filtering out the Glonass G1 signals along with the aggressor transmission signals, e.g., Ligado or GlobalStar transmissions, is acceptable, as long as the other GPS, GAL, BDS signals in the L1 band remain available.

Figure 3A:
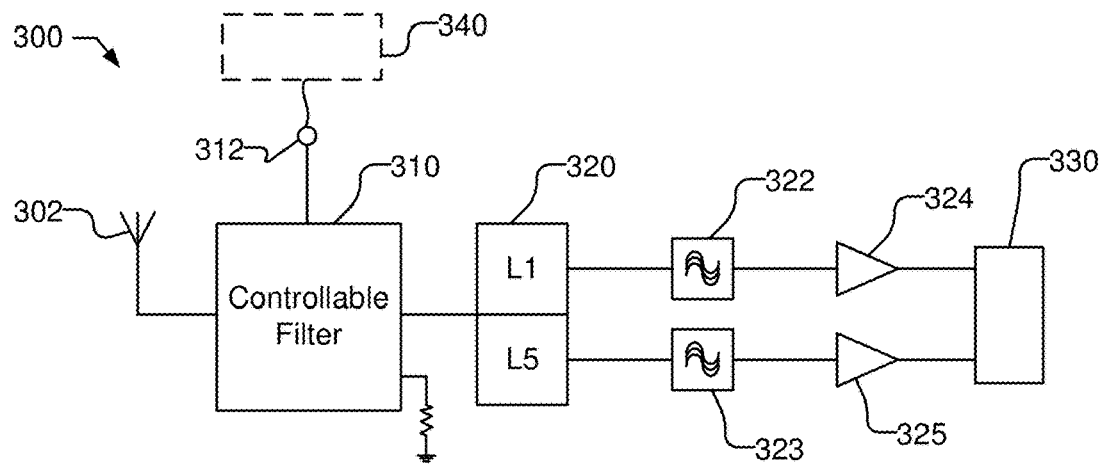
FIGS. 3A and 3B are illustrate a schematic views of a front end SPS receiver with a controllable filter 310 that receives L1 and L5 bands, and receives the L1 band, respectively.
Figure 3B:
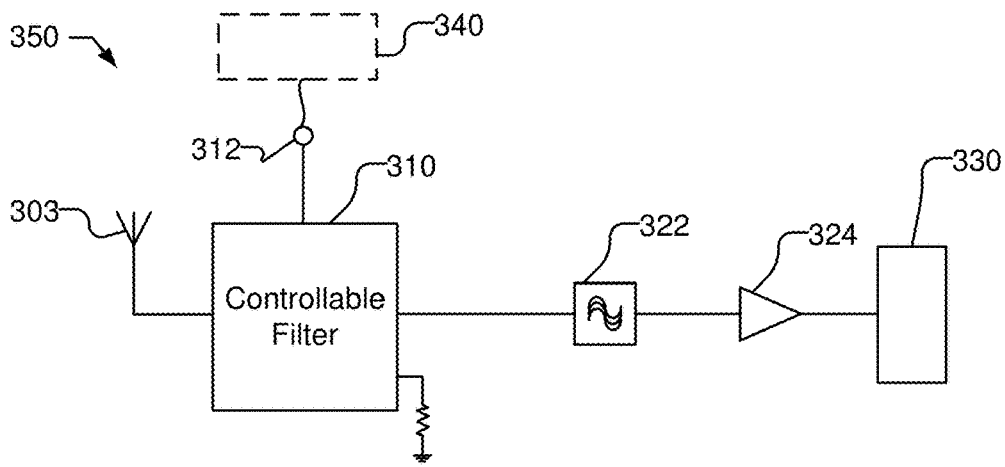

FIGS. 3A and 3B illustrates, by way of example, a schematic views of a front end SPS receiver 300 and 350 with a controllable filter 310. The front end SPS receiver 300 shown in FIG. 3A receives both the L1 band and L5 band, while the front end SPS receiver 350 shown in FIG. 3B receives only the L1 band, but like designated elements may be the same.

The controllable filter 310 may be a notch filter, a low pass filter, a high pass filter, a bandpass filter, a comb filter, or a combination thereof, and may be a selectable filter or a tunable filter. As illustrated the controllable filter 310 is connected to the SPS antenna 302 shown in FIG. 3A and SPS antenna 303 shown in FIG. 3B. The antenna 302 may be shared by the L1 band and L5 band, as illustrated in FIG. 3A. The antenna 303, illustrated in FIG. 3B, on the other hand, may be used for only the L1 band, and the L5 band may be coupled to a different antenna, which may not need a controllable filter. The antenna 302/303 may also be shared with other WWAN/WLAN transceivers.

The controllable filter 310 receives the SPS signals from the antenna 302/303 and a control signal at a control input 312 from a controller 340. For example, the controllable filter 310 may be is a selectable filter and the control signal may be used to indicate whether the controllable filter is to turn on or off, e.g., based on whether the aggressor transmission signal is active or inactive, i.e., when the mobile device 105 is transmitting or not transmitting using aggressor carrier frequencies. In another implementation, the controllable filter 310 may be a tunable filter, which may tune the notch frequency or cutoff frequency to the aggressor carrier frequency or away from the aggressor carrier frequency (and thus away from the SPS signal frequencies). The control signal, for example, may be a voltage or current signal, where the magnitude of the signal adjusts the frequency to which the controllable filter 310 is tuned. The control signal may cause the controllable filter 310 to tune to the aggressor carrier frequency when the aggressor transmission signal is active, and cause the controllable filter 310 to tune away from the aggressor carrier frequency when the aggressor transmission signal is not active. The controllable filter 310, for example, may be controlled to attenuate the aggressor transmission signal when active while performing SPS signal acquisition and tracking using the L1 band, which attenuates a portion of the SPS frequencies, e.g., the Glonass G1 signals, where acquisition and tracking is performed using the remaining SPS frequency band, e.g., the L1 band without the Glonass G1 signals. When the aggressor transmission signal is inactive, the controllable filter 310 is controlled to enable acquisition using the full L1 band, including the Glonass G1 signals.

As illustrated in FIG. 3A, if the antenna 302 receives both L1 and L5 signals, the output of the controllable filter 310 is received by a diplexer 320, which separates the L1 frequencies from the L5 frequencies. The antenna 303 in FIG. 3B, on the other hand, receives only the L1 signals, and thus the diplexer 320 is not necessary. As illustrated, the L1 signals that are output by the diplexer 320 (or directly from the controllable filter 310 in FIG. 3B) may be received by a bandpass filter (BPF) 322 followed by an external low noise amplifier (eLNA) 324, which is followed by the radio-frequency integrated circuit (RFIC) 330. Similarly, as shown in FIG. 3A, the L5 signals that are output by the diplexer 320 may be received by a BPF 323 followed by an eLNA 325, followed by the RFIC 330.

In some implementations, the controllable filter 310 may be integrated into the eLNA 324 and/or the BPF 322 as a module thereby saving printed circuit board (PCB) area. In the absence of the eLNA in the front end SPS receiver 300, the controllable filter 310 may be integrated into the radio-frequency integrated circuit (RFIC) 330.

The controller 340 that provides the control signal to the controllable filter 310 may be, e.g., the RFIC 330 or a modem integrated circuit (IC), or other device, such as a WWAN transceiver. The controller 340 may determine when the aggressor transmission signal is active, for example, by detecting the transmission of the aggressor transmission signal. In some implementations, e.g., where the mobile device 105 is configured for wireless communications that include the aggressor transmission signals, the WWAN transceiver or power amplifier that transmits the wireless communications may detect or are aware of when the aggressor transmission signals are active and provide the control signal to the controllable filter 310. In some implementations, the determination of when the aggressor transmission signal is active may be based on a transmission enablement for the aggressor transmission signal. When the controller 340 detects that the aggressor transmission signal is active, the controller may send the control signal to turn on or tune the controllable filter 310 to set the bandstop (notch) or cutoff frequency to attenuate the aggressor transmission signal, e.g., aggressor carrier frequencies, as well as a portion of the SPS frequencies, e.g., the Glonass G1 signals, but permit reception of the remaining SPS frequencies.

Figure 4:
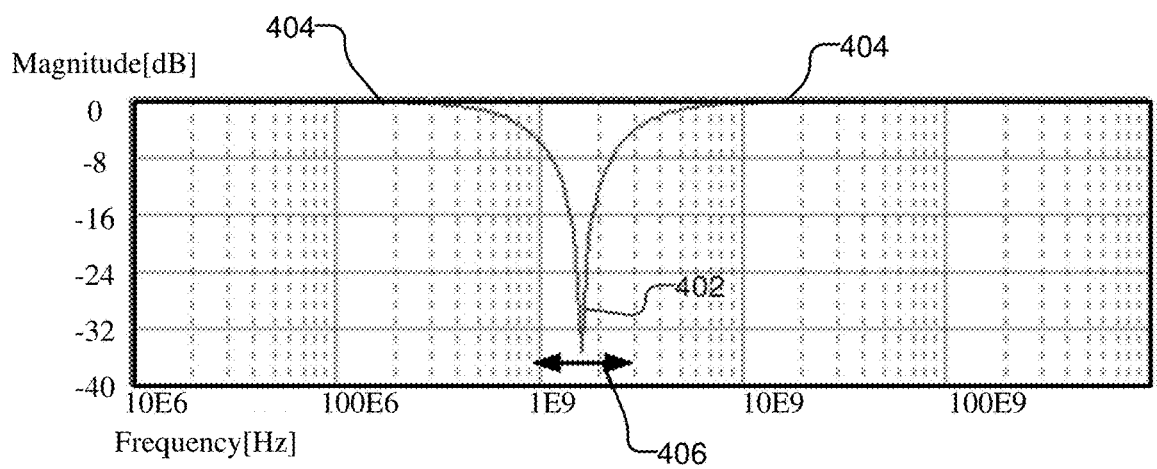
FIG. 4 is a graph illustrating the frequency response of the controllable filter operating as a tunable notch filter.

FIG. 4 is a graph illustrating an example frequency response of the controllable filter 310 operating as a tunable notch filter. As illustrated, the notch filter produces suppression of frequencies within the stop band 402 and passes frequencies outside the stop band, i.e., in the pass bands 404. As illustrated by arrow 406, the stop band 402 may be tuned to desired frequencies, e.g., based on the control signal received by the controllable filter 310. In another implementation, the controllable filter 310 may be turned on to produce the stop band 402, and otherwise turned off. The stop band 402 may be configured to suppress the aggressor transmission signal when active. As the roll off of the stop band 402 is not sharp, a portion of the SPS frequencies, e.g., the Glonass G1 signal, may also be attenuated. When the aggressor transmission signal is not active, the stop band 402 may be tuned away from the aggressor carrier frequency and SPS frequencies, e.g., the stop band 402 may be moved to higher frequencies, so that all SPS frequencies, including the Glonass G1 signal may be received. Alternatively, the controllable filter 310 may be turned off, thereby removing the stop band 402 and permitting all SPS frequencies, including the Glonass G1 signal to be received.

Figure 5:
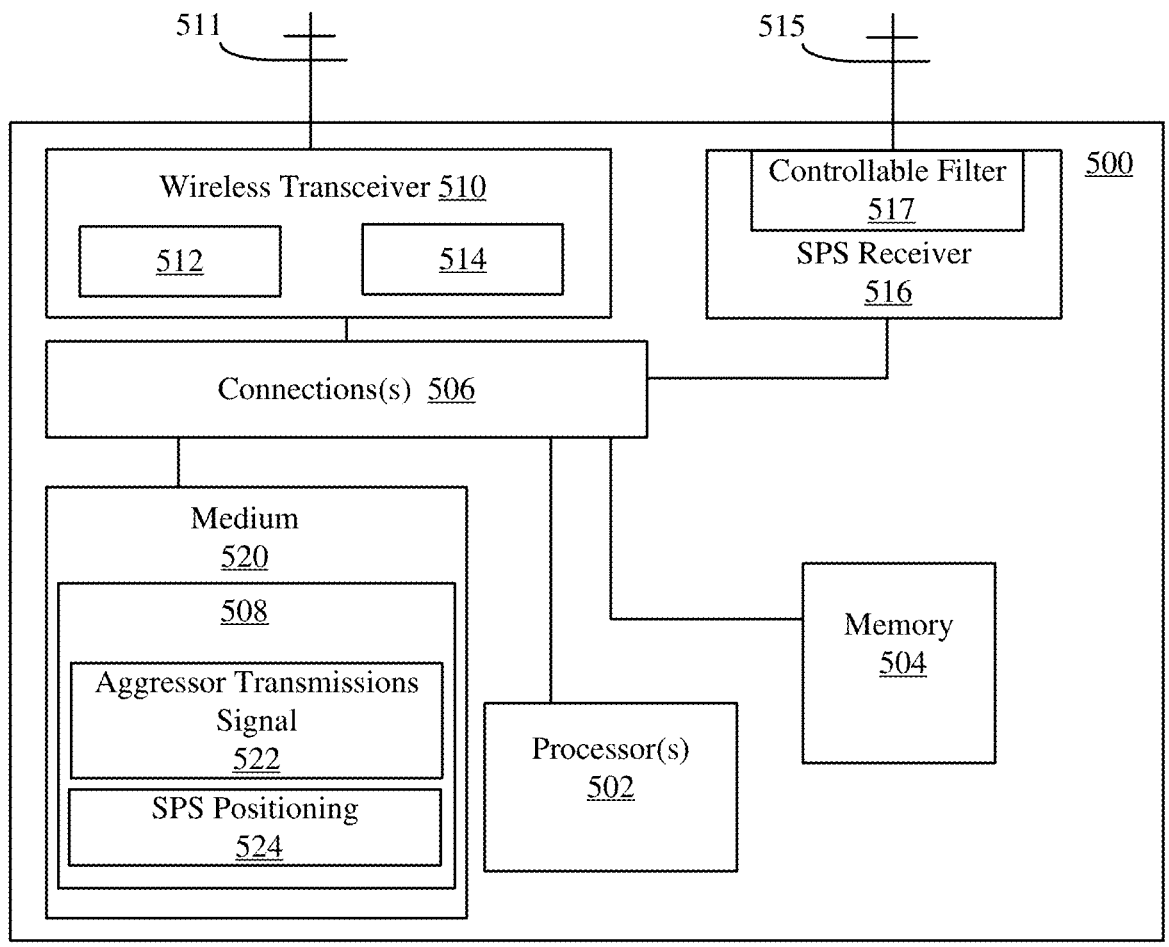
FIG. 5 shows a schematic block diagram illustrating certain exemplary features of a mobile device enabled to support concurrent SPS and wireless communications operations.

FIG. 5 shows a schematic block diagram illustrating certain exemplary features of a mobile device 500, e.g., which may be mobile device 105 shown in FIG. 1, enabled to support concurrent SPS and wireless communications operations, according to the disclosure herein. Mobile device 500 may, for example, include one or more processors 502, memory 504, an external interface such as a wireless transceiver 510, and an SPS receiver 516, which may be operatively coupled with one or more connections 506 (e.g., buses, lines, fibers, links, etc.) to non-transitory computer readable medium 520 and memory 504. The one or more processors 502, for example, may operate as a controller, e.g., controller 340 discussed in FIGS. 3A, 3B, and 4, to determine when an aggressor transmission signal is active and generate a control signal when the aggressor transmission signal is active that controls a controllable filter 517 in the SPS receiver 516 to attenuate the aggressor carrier frequency. In some implementations, the one or more processors 502 may be located within the SPS receiver 516, the wireless transceiver 510, or may be a separate components. Moreover the one or more processors 502 serving as the controller may be located in multiple locations.

The mobile device 500 may further include additional items, which are not shown, such as a user interface that may include e.g., a display, a keypad or other input device, such as virtual keypad on the display, through which a user may interface with the mobile device, or a satellite positioning system receiver. In certain example implementations, all or part of mobile device 500 may take the form of a chipset, and/or the like.

Wireless transceiver 510 may, for example, include a transmitter 512 enabled to transmit one or more signals over one or more types of wireless communication networks and a receiver 514 to receive one or more signals transmitted over the one or more types of wireless communication networks, and may be configured for various communication protocols/standards, such as satellite communications, 5G NR, LTE, Wi-Fi, etc.

The SPS receiver 516 may receive SPS signals with multiple frequency bands and of various satellite position signaling standards, such as GPS, GLONASS, GAL, BDS, and/or other type of satellite positioning system. The SPS receiver 516 may include a measurement engine and a position engine, or one or more of the measurement engine and position engine may be implemented by the one or more processors 502, e.g., implementing one or more instructions or program code 508 on a non-transitory computer readable medium, such as medium 520 and/or memory 504. The SPS receiver 516 may further include a front end that includes a controllable filter 517, e.g., similar to controllable filter 310, that may controlled to suppress wireless communications signals, e.g., transmitted by a satellite communication system, as discussed herein, e.g., at FIGS. 3A, 3B, and 4.

In some embodiments, mobile device 500 may include one or more antennas 511 and 515, which may be internal or external. Antenna 511 may be used to transmit and/or receive signals processed by wireless transceiver 510. In some embodiments, mobile device antenna 511 may be coupled to wireless transceiver 510. In some embodiments, measurements of signals received (transmitted) by mobile device 500 may be performed at the point of connection of the mobile device antenna 511 and wireless transceiver 510. For example, the measurement point of reference for received (transmitted) RF signal measurements may be an input (output) terminal of the receiver 514 (transmitter 512) and an output (input) terminal of the mobile device antenna 511. In a mobile device 500 with multiple mobile device antennas 511 or antenna arrays, the antenna connector may be viewed as a virtual point representing the aggregate output (input) of multiple mobile device antennas. Antenna 515 may be coupled to SPS receiver 516 and may be used to receive SPS signals on multiple frequency bands. In some embodiments, measurements of SPS signals received by mobile device 500 may be performed at the point of connection of the antenna 515 and SPS receiver 516.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of mobile device 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in mobile device 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in mobile device 500 is merely exemplary, and as such the functionality of the modules and/or data structures may be combined, separated, and/or be structured in different ways depending upon the implementation of the mobile device 500.

The medium 520 and/or memory 504 may include an aggressor transmission signal module 522 that when implemented by the one or more processors 502 configures the one or more processors 502 to determine when an aggressor transmission signal is active or inactive, e.g. when the transmitter 512 is transmitting signals on aggressor carrier frequencies, and to produce a control signal to the controllable filter 310 to select or tune the controllable filter 310, in the SPS receiver 516, to attenuate the aggressor carrier frequency when the aggressor transmission signal is active or to de-select (turn off) or tune the controllable filter 310 away from the aggressor carrier frequency (and the SPS frequencies) when the aggressor transmission signal is inactive.

The medium 520 and/or memory 504 may include a SPS positioning module 524 that when implemented by the one or more processors 502 configures the one or more processors 502 to cause the SPS receiver 516 to acquire and track available SPS signals, e.g., non-filtered frequencies, in the L1 band and the L5 band and to use the received SPS signals for determination, e.g., estimation, of position, velocity, time, or any combination thereof for the mobile device.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support concurrent operation of wireless communications and SPS operation, in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a wireless transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
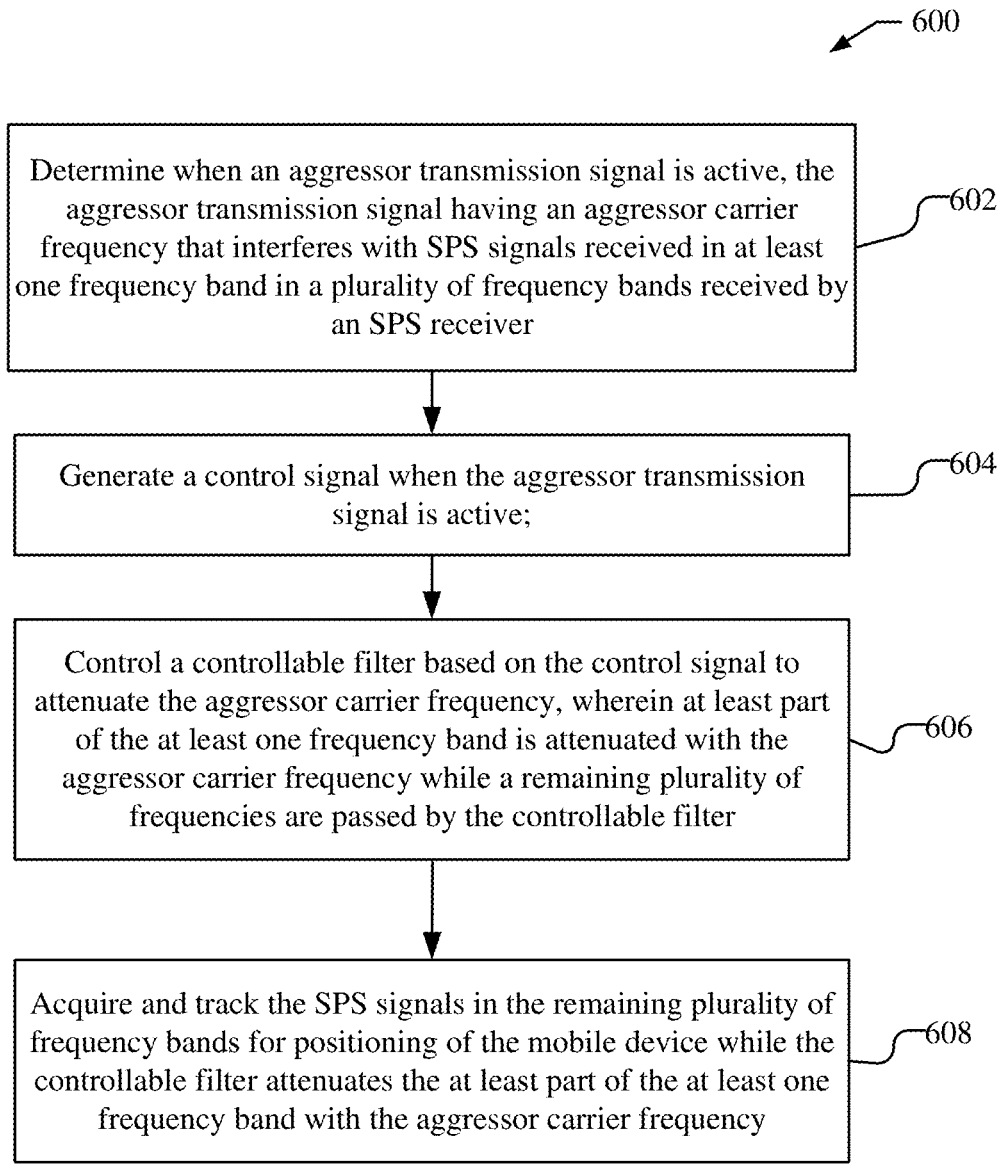
FIG. 6 is a flow chart illustrating a method for supporting satellite positioning system (SPS) operation performed by a mobile device.

FIG. 6 is a flow chart illustrating a method 600 for supporting satellite positioning system (SPS) operation performed by a mobile device, such as mobile device 105 or 500, as described herein.

At block 602, the mobile device 105 may determine when an aggressor transmission signal is active, the aggressor transmission signal having an aggressor carrier frequency that interferes with SPS signals received in at least one frequency band in a plurality of frequency bands received by an SPS receiver, e.g., as discussed in FIGS. 3A and 3B. For example, determining when the aggressor transmission signal is active may include detecting the transmission of the aggressor transmission signal. In another implementation, determining when the aggressor transmission signal is active may be based on a transmission enablement of the aggressor transmission signal. A means for determining when an aggressor transmission signal is active, the aggressor transmission signal having an aggressor carrier frequency that interferes with SPS signals received in at least one frequency band in a plurality of frequency bands received by an SPS receiver may include the SPS receiver 516, including an RFIC 330 or a modem IC, or a wireless transceiver 510, along with one or more processors 502 with dedicated hardware or implementing executable code or software instructions in memory 504 and/or medium 520 such as the aggressor transmission signal module 522.

At block 604, a control signal is generated when the aggressor transmission signal is active, e.g., as discussed in FIGS. 3A and 3B. A means for generating a control signal when the aggressor transmission signal is active may include the SPS receiver 516, including an RFIC 330 or a modem IC, or a wireless transceiver 510, along with one or more processors 502 with dedicated hardware or implementing executable code or software instructions in memory 504 and/or medium 520 such as the aggressor transmission signal module 522.

At block 606, a controllable filter is controlled based on the control signal to attenuate the aggressor carrier frequency, wherein at least part of the at least one frequency band is attenuated with the aggressor carrier frequency while a remaining plurality of frequencies are passed by the controllable filter, e.g., as discussed in FIGS. 3A and 3B. In one implementation, the controllable filter, for example, may be one of a notch filter or a low pass filter. In one implementation, the controllable filter may be a selectable filter and the control signal indicates when the selectable filter is to turn on or off. In one implementation, the controllable filter may be a tunable filter and the control signal may indicate a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active. A means for controlling a controllable filter based on the control signal to attenuate the aggressor carrier frequency, wherein at least part of the at least one frequency band is attenuated with the aggressor carrier frequency while a remaining plurality of frequencies are passed by the controllable filter may include the SPS receiver 516, including a controllable filter 310.

At block 608, the SPS signals in the remaining plurality of frequency bands are acquired and tracked while the controllable filter attenuates the at least part of the at least one frequency band with the aggressor carrier frequency, e.g., as discussed in FIGS. 3A and 3B. For example, the SPS signals that are acquired and tracked may be used for determination of one or more of position, velocity, time, or a combination thereof, for the mobile device. A means for acquiring and tracking the SPS signals in the remaining plurality of frequency bands for positioning of the mobile device while the controllable filter attenuates the at least part of the at least one frequency band with the aggressor carrier frequency may include the SPS receiver 516, including the controllable filter 310 along with one or more processors 502 with dedicated hardware or implementing executable code or software instructions in memory 504 and/or medium 520 such as the SPS positioning module 524.

In one implementation, the at least one frequency band that is interfered with by the aggressor carrier frequency may be the L1 band, and the SPS signals acquired and tracked in the L1 band may be at least one of a BeiDou (BDS) B1i signal, a BDS BIC signal, a Galileo E1 signal, and a Global Positioning System (GPS) L1. The at least part of the L1 band that is attenuated with the aggressor carrier frequency by the controllable filter may be the GLONASS L1OF or G1 signal.

In one implementation, the method may further includes controlling a controllable filter based on the control signal to pass the plurality of frequencies without attenuating the at least part of the at least one frequency band when the aggressor transmission signal is not active, e.g., as discussed in FIGS. 3A and 3B. A means for controlling a controllable filter based on the control signal to pass the plurality of frequencies without attenuating the at least part of the at least one frequency band when the aggressor transmission signal is not active may include the SPS receiver 516, including the controllable filter 310. The method may further include acquiring and tracking the SPS signals in the plurality of frequency bands while the controllable filter does not attenuate the at least part of the at least one frequency band, e.g., as discussed in FIGS. 3A and 3B. A means for acquiring and tracking the SPS signals in the plurality of frequency bands while the controllable filter does not attenuate the at least part of the at least one frequency band may include the SPS receiver 516, including the controllable filter 310 along with one or more processors 502 with dedicated hardware or implementing executable code or software instructions in memory 504 and/or medium 520 such as the SPS positioning module 524.

In one implementation, the method may further include performing SPS signal acquisition and tracking using the SPS signals acquired and tracked in the remaining plurality of frequency bands while the controllable filter attenuates the at least part of the at least one frequency band with the aggressor carrier frequency, e.g., as discussed in FIGS. 3A and 3B. A means for performing SPS signal acquisition and tracking using the SPS signals acquired and tracked in the remaining plurality of frequency bands while the controllable filter attenuates the at least part of the at least one frequency band with the aggressor carrier frequency may include the SPS receiver 516, including the controllable filter 310 along with one or more processors 502 with dedicated hardware or implementing executable code or software instructions in memory 504 and/or medium 520 such as the SPS positioning module 524.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A satellite-based positioning system typically includes a system of transmitters positioned to enable entities to determine their position on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, a SV in a constellation of Global Navigation Satellite System (GNSS) such as Global Positioning System GPS, Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS). For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., an Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit GNSS and/or GNSS-like signals that may also be interfered with by certain wireless communication signals, etc. Thus, as used herein, an SPS may include any combination of one or more global and/or regional navigation satellite systems and/or augmentation systems.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

In view of this description embodiments may include different combinations of features. Implementation examples are described in the following numbered clauses:

Clause 1. A method performed by a mobile device for supporting satellite positioning system (SPS) operation, the method comprising: determining when an aggressor transmission signal is active, the aggressor transmission signal having an aggressor carrier frequency that interferes with SPS signals received in at least one frequency band in a plurality of frequency bands received by an SPS receiver; generating a control signal when the aggressor transmission signal is active; controlling a controllable filter based on the control signal to attenuate the aggressor carrier frequency, wherein at least part of the at least one frequency band is attenuated with the aggressor carrier frequency while a remaining plurality of frequencies are passed by the controllable filter; and acquiring and tracking the SPS signals in the remaining plurality of frequency bands while the controllable filter attenuates the at least part of the at least one frequency band with the aggressor carrier frequency.

Clause 2. The method of clause 1, wherein the controllable filter is one or more of a notch filter, a low pass filter, a high pass filter, a bandpass filter, a comb filter, or a combination thereof.

Clause 3. The method of any of clauses 1-2, wherein the controllable filter is a selectable filter and the control signal indicates when the selectable filter is to turn on or off.

Clause 4. The method of any of clauses 1-2, wherein the controllable filter is a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

Clause 5. The method of any of clauses 1-4, wherein the at least one frequency band that is interfered with by the aggressor carrier frequency is an L1 band, and the SPS signals acquired and tracked in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

Clause 6. The method of clause 5, wherein the at least part of the L1 band that is attenuated with the aggressor carrier frequency by the controllable filter comprises the GLONASS L1OF or G1 signal.

Clause 7. The method of any of clauses 1-6, further comprising: controlling the controllable filter based on the control signal to pass the plurality of frequency bands without attenuating the at least part of the at least one frequency band when the aggressor transmission signal is not active; and acquiring and tracking the SPS signals in the plurality of frequency bands while the controllable filter does not attenuate the at least part of the at least one frequency band.

Clause 8. The method of any of clauses 1-7, further comprising performing SPS signal acquisition and tracking using the SPS signals acquired and tracked in the remaining plurality of frequency bands while the controllable filter attenuates the at least part of the at least one frequency band with the aggressor carrier frequency.

Clause 9. The method of any of clauses 1-8, wherein determining when the aggressor transmission signal is active comprises detecting transmission of the aggressor transmission signal.

Clause 10. The method of any of clauses 1-9, wherein determining when the aggressor transmission signal is active is based on a transmitter in the mobile device that generates the aggressor transmission signal.

Clause 11. A mobile device configured to support satellite positioning system (SPS) operation, the mobile device comprising: a satellite positioning system (SPS) receiver configured to receive SPS signals over a plurality of frequency bands; a controllable filter configured to receive a control signal and to attenuate one or more frequencies in response to the control signal; a controller coupled to the SPS receiver and the controllable filter and configured to: determine when an aggressor transmission signal is active, the aggressor transmission signal having an aggressor carrier frequency that interferes with the SPS signals received in at least one frequency band in the plurality of frequency bands received by the SPS receiver; generate the control signal when the aggressor transmission signal is active, wherein the controllable filter is controlled based on the control signal to attenuate the aggressor carrier frequency, wherein at least part of the at least one frequency band is attenuated with the aggressor carrier frequency while a remaining plurality of frequencies are passed by the controllable filter; and wherein the SPS signals in the remaining plurality of frequency bands is acquired and tracked by the SPS receiver while the controllable filter attenuates the at least part of the at least one frequency band with the aggressor carrier frequency.

Clause 12. The mobile device of clause 11, wherein the controller is an at least one processor.

Clause 13. The mobile device of any of clauses 11-12, further comprising a wireless transceiver configured to transmit the aggressor transmission signal, and to provide an indication when the aggressor transmission signal is active.

Clause 14. The mobile device of any of clauses 11-13, wherein the controllable filter is one or more of a notch filter, a low pass filter, a high pass filter, a bandpass filter, a comb filter, or a combination thereof.

Clause 15. The mobile device of any of clauses 11-14, wherein the controllable filter is a selectable filter and the control signal indicates when the selectable filter is to turn on or off.

Clause 16. The mobile device of any of clauses 11-14, wherein the controllable filter is a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

Clause 17. The mobile device of any of clauses 11-16, wherein the at least one frequency band that is interfered with by the aggressor carrier frequency is an L1 band, and the SPS signals acquired and tracked in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

Clause 18. The mobile device of clause 17, wherein the at least part of the L1 band that is attenuated with the aggressor carrier frequency by the controllable filter comprises the GLONASS L1OF or G1 signal.

Clause 19. The mobile device of any of clauses 11-18, wherein the controller is further configured to: control the controllable filter based on the control signal to pass the plurality of frequency bands without attenuating the at least part of the at least one frequency band when the aggressor transmission signal is not active, wherein the SPS signals in the plurality of frequency bands are acquired and tracked while the controllable filter does not attenuate the at least part of the at least one frequency band.

Clause 20. The mobile device of any of clauses 11-19, wherein SPS signal acquisition and tracking is performed using the SPS signals acquired and tracked in the remaining plurality of frequency bands while the controllable filter attenuates the at least part of the at least one frequency band with the aggressor carrier frequency.

Clause 21. The mobile device of any of clauses 11-20, wherein the controller is configured to determine when the aggressor transmission signal is active by being configured to detect transmission of the aggressor transmission signal.

Clause 22. The mobile device of any of clauses 11-21, wherein the controller is configured to determine when the aggressor transmission signal is active based on a transmission enablement of the aggressor transmission signal.

Clause 23. A mobile device configured to support satellite positioning system (SPS) operation, the mobile device comprising: means for determining when an aggressor transmission signal is active, the aggressor transmission signal having an aggressor carrier frequency that interferes with SPS signals received in at least one frequency band in a plurality of frequency bands received by an SPS receiver; means for generating a control signal when the aggressor transmission signal is active; means for controlling a controllable filter based on the control signal to attenuate the aggressor carrier frequency, wherein at least part of the at least one frequency band is attenuated with the aggressor carrier frequency while a remaining plurality of frequencies are passed by the controllable filter; and means for acquiring and tracking the SPS signals in the remaining plurality of frequency bands while the controllable filter attenuates the at least part of the at least one frequency band with the aggressor carrier frequency.

Clause 24. The mobile device of clause 23, wherein the controllable filter is one or more of a notch filter, a low pass filter, a high pass filter, a bandpass filter, a comb filter, or a combination thereof.

Clause 25. The mobile device of any of clauses 23-24, wherein the controllable filter is a selectable filter and the control signal indicates when the selectable filter is to turn on or off.

Clause 26. The mobile device of any of clauses 23-24, wherein the controllable filter is a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

Clause 27. The mobile device of any of clauses 23-26, wherein the at least one frequency band that is interfered with by the aggressor carrier frequency is an L1 band, and the SPS signals acquired and tracked in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

Clause 28. The mobile device of clause 27, wherein the at least part of the L1 band that is attenuated with the aggressor carrier frequency by the controllable filter comprises the GLONASS L1OF or G1 signal.

Clause 29. The mobile device of any of clauses 23-28, further comprising: means for controlling the controllable filter based on the control signal to pass the plurality of frequency bands without attenuating the at least part of the at least one frequency band when the aggressor transmission signal is not active; and means for acquiring and tracking the SPS signals in the plurality of frequency bands while the controllable filter does not attenuate the at least part of the at least one frequency band.

Clause 30. The mobile device of any of clauses 23-29, further comprising means for performing SPS signal acquisition and tracking using the SPS signals acquired and tracked in the remaining plurality of frequency bands while the controllable filter attenuates the at least part of the at least one frequency band with the aggressor carrier frequency.

Clause 31. The mobile device of any of clauses 23-30, wherein determining when the aggressor transmission signal is active comprises detecting transmission of the aggressor transmission signal.

Clause 32. The mobile device of any of clauses 23-31, wherein the means for determining when the aggressor transmission signal is active detects transmission of the aggressor transmission signal or is based on a transmitter in the mobile device that generates the aggressor transmission signal.

Clause 33. A non-transitory storage medium including program code stored thereon, the program code is operable to configure at least one controller in a mobile device to support satellite positioning system (SPS) operation, the program code comprising instructions to: determine when an aggressor transmission signal is active, the aggressor transmission signal having an aggressor carrier frequency that interferes with SPS signals received in at least one frequency band in a plurality of frequency bands received by an SPS receiver; generate a control signal when the aggressor transmission signal is active; control a controllable filter based on the control signal to attenuate the aggressor carrier frequency, wherein at least part of the at least one frequency band is attenuated with the aggressor carrier frequency while a remaining plurality of frequencies are passed by the controllable filter; and acquire and track the SPS signals in the remaining plurality of frequency bands while the controllable filter attenuates the at least part of the at least one frequency band with the aggressor carrier frequency.

Clause 34. The non-transitory storage medium of clause 33, wherein the controllable filter is one or more of a notch filter, a low pass filter, a high pass filter, a bandpass filter, a comb filter, or a combination thereof.

Clause 35. The non-transitory storage medium of any of clauses 33-34, wherein the controllable filter is a selectable filter and the control signal indicates when the selectable filter is to turn on or off.

Clause 36. The non-transitory storage medium of any of clauses 33-34, wherein the controllable filter is a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

Clause 37. The non-transitory storage medium of any of clauses 33-36, wherein the at least one frequency band that is interfered with by the aggressor carrier frequency is an L1 band, and the SPS signals acquired and tracked in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

Clause 38. The non-transitory storage medium of clause 37, wherein the at least part of the L1 band that is attenuated with the aggressor carrier frequency by the controllable filter comprises the GLONASS L1OF or G1 signal.

Clause 39. The non-transitory storage medium of any of clauses 33-38, wherein the program code further comprises instructions to: control the controllable filter based on the control signal to pass the plurality of frequency bands without attenuating the at least part of the at least one frequency band when the aggressor transmission signal is not active; and acquire and track the SPS signals in the plurality of frequency bands while the controllable filter does not attenuate the at least part of the at least one frequency band.

Clause 40. The non-transitory storage medium of any of clauses 33-39, wherein the program code further comprises instructions to perform SPS signal acquisition and tracking using the SPS signals acquired and tracked in the remaining plurality of frequency bands while the controllable filter attenuates the at least part of the at least one frequency band with the aggressor carrier frequency.

Clause 41. The non-transitory storage medium of any of clauses 33-40, wherein the instructions to determine when the aggressor transmission signal is active comprises instructions to detect transmission of the aggressor transmission signal.

Clause 42. The non-transitory storage medium of any of clauses 33-41, wherein the instructions to determine when the aggressor transmission signal is active uses the aggressor transmission signal generated by a transmitter in the mobile device.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method performed by a mobile device for supporting satellite positioning system (SPS) operation, the method comprising:
   determining when an aggressor transmission signal is active, the aggressor transmission signal comprising at least a signal transmitted by the mobile device, the aggressor transmission signal having an aggressor carrier frequency that interferes with SPS signals received in at least one frequency band comprising a first L1 band in a plurality of frequency bands received by an SPS receiver, wherein the aggressor carrier frequency is outside of the Aeronautical Radio Navigation System (ARNS) bands;
   generating a control signal when the aggressor transmission signal is active;
   controlling a controllable filter based on the control signal to attenuate the aggressor carrier frequency, wherein at least part of the first L1 band is attenuated with the aggressor carrier frequency while a remaining plurality of frequencies comprising L5 bands and L1 bands without the at least part of the first L1 band are passed by the controllable filter, wherein the at least part of the first L1 band that is attenuated with the aggressor carrier frequency by the controllable filter comprises a Global Navigation Satellite System (GLONASS) L1OF or G1 signal; and
   acquiring and tracking the SPS signals in the remaining plurality of frequency bands while the controllable filter attenuates the at least part of the first L1 band with the aggressor carrier frequency.

2. The method of claim 1, wherein the controllable filter is one or more of a notch filter, a low pass filter, a high pass filter, a bandpass filter, a comb filter, or a combination thereof.

3. The method of claim 1, wherein the controllable filter is a selectable filter and the control signal indicates when the selectable filter is to turn on or off.

4. The method of claim 1, wherein the SPS signals received in the first L1 band comprise at least one of a BeiDou (BDS) B1i signal, a BDS BIC signal, a Galileo E1 signal, a Global Positioning System (GPS) L1, and a Global Navigation Satellite System (GLONASS) L1OF or G1 signal.

5. The method of claim 1, further comprising:
   controlling the controllable filter based on the control signal to pass the plurality of frequency bands without attenuating the at least part of the at least one frequency band when the aggressor transmission signal is not active; and
   acquiring and tracking the SPS signals in the plurality of frequency bands while the controllable filter does not attenuate the at least part of the at least one frequency band.

6. The method of claim 1, further comprising performing SPS signal acquisition and tracking using the SPS signals acquired and tracked in the remaining plurality of frequency bands while the controllable filter attenuates the at least part of the at least one frequency band with the aggressor carrier frequency.

7. The method of claim 1, wherein determining when the aggressor transmission signal is active comprises detecting transmission of the aggressor transmission signal.

8. The method of claim 1, wherein determining when the aggressor transmission signal is active is based on a transmitter in the mobile device that generates the aggressor transmission signal.

9. The method of claim 1, wherein the acquiring and tracking the SPS signals in the remaining plurality of frequency bands comprises acquiring and tracking the SPS signals in the remaining plurality of frequency bands while a diplexer separates the L1 bands and the L5 bands.

10. The method of claim 1, wherein the controllable filter comprises a tunable filter, and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

11. A mobile device configured to support satellite positioning system (SPS) operation, the mobile device comprising:
a satellite positioning system (SPS) receiver configured to receive SPS signals over a plurality of frequency bands;
a controllable filter configured to receive a control signal and to attenuate one or more frequencies in response to the control signal; and
a controller coupled to the SPS receiver and the controllable filter and configured to:
determine when an aggressor transmission signal is active, the aggressor transmission signal comprising at least a signal transmitted by the mobile device, the aggressor transmission signal having an aggressor carrier frequency that interferes with the SPS signals received in at least one frequency band comprising an L1 band in the plurality of frequency bands received by the SPS receiver, wherein the aggressor carrier frequency is outside of the Aeronautical Radio Navigation System (ARNS) bands;
generate the control signal when the aggressor transmission signal is active, wherein the controllable filter is controlled based on the control signal to attenuate the aggressor carrier frequency, wherein at least part of the L1 band is attenuated with the aggressor carrier frequency while a remaining plurality of frequencies comprising L5 bands and L1 bands without the at least part of the L1 band are passed by the controllable filter, wherein the at least part of the first L1 band that is attenuated with the aggressor carrier frequency by the controllable filter comprises a Global Navigation Satellite System (GLONASS) L1OF or G1 signal; and
wherein the SPS signals in the remaining plurality of frequency bands is acquired and tracked by the SPS receiver while the controllable filter attenuates the at least part of the L1 band with the aggressor carrier frequency.

12. The mobile device of claim 11, wherein the controller is an at least one processor.

13. The mobile device of claim 11, further comprising a wireless transceiver configured to transmit the aggressor transmission signal, and to provide an indication when the aggressor transmission signal is active.

14. The mobile device of claim 11, wherein the controllable filter is one or more of a notch filter, a low pass filter, a high pass filter, a bandpass filter, a comb filter, or a combination thereof.

15. The mobile device of claim 11, wherein the controllable filter is a selectable filter and the control signal indicates when the selectable filter is to turn on or off.

16. The mobile device of claim 11, wherein the SPS signals received in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

17. The mobile device of claim 11, wherein the controller is further configured to:
control the controllable filter based on the control signal to pass the plurality of frequency bands without attenuating the at least part of the at least one frequency band when the aggressor transmission signal is not active, wherein the SPS signals in the plurality of frequency bands are acquired and tracked while the controllable filter does not attenuate the at least part of the at least one frequency band.

18. The mobile device of claim 11, wherein SPS signal acquisition and tracking is performed using the SPS signals acquired and tracked in the remaining plurality of frequency bands while the controllable filter attenuates the at least part of the at least one frequency band with the aggressor carrier frequency.

19. The mobile device of claim 11, wherein the controller is configured to determine when the aggressor transmission signal is active by being configured to detect transmission of the aggressor transmission signal.

20. The mobile device of claim 11, wherein the controller is configured to determine when the aggressor transmission signal is active based on a transmission enablement of the aggressor transmission signal.

21. The mobile device of claim 11, wherein the controllable filter comprises a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

22. A mobile device configured to support satellite positioning system (SPS) operation, the mobile device comprising:
means for determining when an aggressor transmission signal is active, the aggressor transmission signal comprising at least a signal transmitted by the mobile device, the aggressor transmission signal having an aggressor carrier frequency that interferes with SPS signals received in at least one frequency band comprising an L1 band in a plurality of frequency bands received by an SPS receiver, wherein the aggressor carrier frequency is outside of the Aeronautical Radio Navigation System (ARNS) bands;
means for generating a control signal when the aggressor transmission signal is active;
means for controlling a controllable filter based on the control signal to attenuate the aggressor carrier frequency, wherein at least part of the L1 band is attenuated with the aggressor carrier frequency while a remaining plurality of frequencies comprising L5 bands and L1 bands without the at least part of the L1 band are passed by the controllable filter, wherein the at least part of the first L1 band that is attenuated with the aggressor carrier frequency by the controllable filter comprises a Global Navigation Satellite System (GLONASS) L1OF or G1 signal; and
means for acquiring and tracking the SPS signals in the remaining plurality of frequency bands while the controllable filter attenuates the at least part of the L1 band with the aggressor carrier frequency.

23. The mobile device of claim 22, wherein the controllable filter is one or more of a notch filter, a low pass filter, a high pass filter, a bandpass filter, a comb filter, or a combination thereof.

24. The mobile device of claim 22, wherein the controllable filter is a selectable filter and the control signal indicates when the selectable filter is to turn on or off.

25. The mobile device of claim 22, wherein the SPS signals received in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

26. The mobile device of claim 22, further comprising:
means for controlling the controllable filter based on the control signal to pass the plurality of frequency bands without attenuating the at least part of the at least one frequency band when the aggressor transmission signal is not active; and
means for acquiring and tracking the SPS signals in the plurality of frequency bands while the controllable filter does not attenuate the at least part of the at least one frequency band.

27. The mobile device of claim 22, further comprising means for performing SPS signal acquisition and tracking using the SPS signals acquired and tracked in the remaining plurality of frequency bands while the controllable filter attenuates the at least part of the at least one frequency band with the aggressor carrier frequency.

28. The mobile device of claim 22, wherein determining when the aggressor transmission signal is active comprises detecting transmission of the aggressor transmission signal.

29. The mobile device of claim 22, wherein the means for determining when the aggressor transmission signal is active detects transmission of the aggressor transmission signal or is based on a transmitter in the mobile device that generates the aggressor transmission signal.

30. The mobile device of claim 22, wherein the controllable filter comprises a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

31. A non-transitory storage medium including program code stored thereon, the program code is operable to configure at least one controller in a mobile device to support satellite positioning system (SPS) operation, the program code comprising instructions to:
determine when an aggressor transmission signal is active, the aggressor transmission signal comprising at least a signal transmitted by the mobile device, the aggressor transmission signal having an aggressor carrier frequency that interferes with SPS signals received in at least one frequency band comprising an L1 band in a plurality of frequency bands received by an SPS receiver, wherein the aggressor carrier frequency is outside of the Aeronautical Radio Navigation System (ARNS) bands;
generate a control signal when the aggressor transmission signal is active;
control a controllable filter based on the control signal to attenuate the aggressor carrier frequency, wherein at least part of the L1 band is attenuated with the aggressor carrier frequency while a remaining plurality of frequencies comprising L5 bands and L1 bands without the at least part of the L1 band are passed by the controllable filter, wherein the at least part of the first L1 band that is attenuated with the aggressor carrier frequency by the controllable filter comprises a Global Navigation Satellite System (GLONASS) L1OF or G1 signal; and
acquire and track the SPS signals in the remaining plurality of frequency bands while the controllable filter attenuates the at least part of the L1 band with the aggressor carrier frequency.

32. The non-transitory storage medium of claim 31, wherein the controllable filter is one or more of a notch filter, a low pass filter, a high pass filter, a bandpass filter, a comb filter, or a combination thereof.

33. The non-transitory storage medium of claim 31, wherein the controllable filter is a selectable filter and the control signal indicates when the selectable filter is to turn on or off.

34. The non-transitory storage medium of claim 31, wherein the SPS signals received in the L1 band comprise at least one of a BeiDou (BDS) B1i signal, a BDS B1C signal, a Galileo E1 signal, a Global Positioning System (GPS) L1, and a Global Navigation Satellite System (GLONASS) L1OF or G1 signal.

35. The non-transitory storage medium of claim 31, wherein the program code further comprises instructions to:
control the controllable filter based on the control signal to pass the plurality of frequency bands without attenuating the at least part of the at least one frequency band when the aggressor transmission signal is not active; and
acquire and track the SPS signals in the plurality of frequency bands while the controllable filter does not attenuate the at least part of the at least one frequency band.

36. The non-transitory storage medium of claim 31, wherein the program code further comprises instructions to perform SPS signal acquisition and tracking using the SPS signals acquired and tracked in the remaining plurality of frequency bands while the controllable filter attenuates the at least part of the at least one frequency band with the aggressor carrier frequency.

37. The non-transitory storage medium of claim 31, wherein the instructions to determine when the aggressor transmission signal is active comprises instructions to detect transmission of the aggressor transmission signal.

38. The non-transitory storage medium of claim 31, wherein the instructions to determine when the aggressor transmission signal is active uses the aggressor transmission signal generated by a transmitter in the mobile device.

39. The non-transitory storage medium of claim 31, wherein the controllable filter comprises a tunable filter and the control signal indicates a carrier frequency to which the tunable filter is to be tuned, wherein the control signal causes the tunable filter to tune to the aggressor carrier frequency when the aggressor transmission signal is active, and causes the tunable filter to tune away from the aggressor carrier frequency when the aggressor transmission signal is not active.

* * * * *